United States Patent
Barattini et al.

Patent No.: US 6,348,425 B1
Date of Patent: Feb. 19, 2002

(54) CRYSTALLIZING GLAZE SYSTEM

(75) Inventors: Marzia Barattini; Paolo Bertocchi; Emanuela Neri, all of Modena (IT)

(73) Assignee: Ferro Corporation, Cleveland, OH (US)

(*) Notice: Subject to any disclaimer, the term of this patent is extended or adjusted under 35 U.S.C. 154(b) by 0 days.

(21) Appl. No.: 09/602,918

(22) Filed: Jun. 23, 2000

(30) Foreign Application Priority Data

Jul. 5, 1999 (EP) ................................................. 9912962

(51) Int. Cl.$^7$ ................................................. C03C 10/04
(52) U.S. Cl. ................................. 501/5; 501/72; 501/21
(58) Field of Search ................................. 501/5, 2, 14, 21, 501/72

(56) References Cited

U.S. PATENT DOCUMENTS

| | | | |
|---|---|---|---|
| 3,847,626 A | * | 11/1974 | Erickson et al. |
| 4,337,316 A | * | 6/1982 | Votava |
| 4,352,890 A | * | 10/1982 | Votava |
| 4,390,636 A | * | 6/1983 | Votava |
| 4,560,666 A | * | 12/1985 | Yoshida et al. |
| 4,582,760 A | * | 4/1986 | Beall et al. |
| 4,643,982 A | * | 2/1987 | Kasuga et al. |
| 4,783,429 A | * | 11/1988 | Shibuya et al. |
| 5,061,307 A | * | 10/1991 | Matano et al. |
| 5,066,619 A | * | 11/1991 | Kasuga et al. |
| 5,246,889 A | * | 9/1993 | Kasuga et al. |
| 5,948,129 A | * | 9/1999 | Nonami et al. |
| 6,031,694 A | * | 2/2000 | Tamura et al. |

FOREIGN PATENT DOCUMENTS

| | | | |
|---|---|---|---|
| JP | 61197446 | * | 9/1986 |
| JP | 03174340 | * | 7/1991 |
| JP | 200128628 | * | 5/2000 |

OTHER PUBLICATIONS

Baldi e tal., "Effects of nucleating agents on diopside crystallization in new glass–ceramics for tile–glaze application," University of Modena, Italy, 1995, pp. 3251–3255.
Leonelli, et al., "Crystallization of some anorthite–diopside glass precursors," University of Modena, Itlay, 1991, pp. 5041–5046.

* cited by examiner

Primary Examiner—Tom Dunn
Assistant Examiner—Colleen P. Cooke
(74) Attorney, Agent, or Firm—Rankin, Hill, Porter & Clark LLP

(57) ABSTRACT

The present invention provides a glass-ceramic glaze composition for use in the production of ceramic tile. The glaze composition comprises a glass composition from which diopside crystals can be formed, a diopside crystallization rate controller, a surface texture controller, and other optional fillers, pigments and additives. Preferably, the glass composition comprises one or more glass frits containing precursors from which diopside crystals can be formed. The diopside crystallization rate controller comprises mill added sodium feldspar, potassium feldspar, nepheline, and/or spodumene, with sodium feldspar being preferred. The surface texture controller preferably comprises zinc oxide and calcined alumina. When fired on a ceramic tile, the glaze composition of the present invention provides a semi-transparent to translucent, smooth matte finish that displays excellent chemical durability and abrasion resistance.

11 Claims, No Drawings

CRYSTALLIZING GLAZE SYSTEM

FIELD OF THE INVENTION

The present invention concerns a glass-ceramic glaze for use on tile. More particularly, the present invention concerns a diopside crystallizing glass-ceramic glaze for use in forming a smooth matte finish on architectural tile that is both chemically durable and abrasion resistant.

BACKGROUND

The prior art provides various methods for forming ceramic tiles and various glaze compositions which can be used to produce a protective surface on such tiles. Generally speaking, ceramic tiles are formed from batches of natural or synthetic raw materials such as clay, kaolin, quartz, feldspar, wollastonite, talc, calcium carbonate, dolomite, calcined kaolin, hard clay chamotte-grog, oxides such as alumina, silica, corundum and mixtures of the foregoing. Binders and other additives may also be employed to increase the raw mechanical strength of the raw tiles. Once formed, the raw ceramic tiles must be fired to form biscuits that are hard, tough, and brittle.

In many instances, a glaze composition, which usually comprises one or more glass frits, fillers, pigments, and other additives, is applied to the raw tiles prior to the firing operation to impart a protective surface to the ceramic tiles. Upon firing, the raw tile hardens and the glaze composition forms a vitreous, transparent to opaque surface layer that can be glossy to dull (matte) or somewhere in between. It addition to the single fire approach, it is also well-known in the art to produce glazed ceramic tiles by a double fire approach. In the double fire approach, the glaze composition is applied to a once-fired biscuit and the glaze composition-coated biscuit is subjected to a second firing operation in order to produce the finished ceramic tile.

For certain applications, such as in the production of architectural floor tiles for example, it is highly desirable for the glaze composition to form a smooth semi-transparent to translucent matte finish on the ceramic tile that is both chemically durable and abrasion resistant. Some crystallizing glaze compositions are known to be useful for this purpose, but they are usually formed from relatively expensive raw materials. Attempts have been made in the past to develop glazes based upon the crystallization of diopside (chemical structure: $CaMgSi_2O_6$), which can be formed from virtually any silica containing glass frit composition that contains an appropriate quantity of MgO and CaO, a low quantity of other alkali-earth oxides, and a low quantity of fluxing oxides. However, such prior attempts have been unsuccessful because diopside energetically crystallizes in single-fast-fire (SFF) and gres porcellanato ceramic tile firing cycles, which results in a glaze which is over-crystallized and exhibits an unpleasant appearing very rough, hard and dry surface.

SUMMARY OF THE INVENTION

The present invention provides a novel glass-ceramic glaze composition for use on ceramic tile. The glaze composition comprises a glass composition from which diopside crystals can be formed, a diopside crystallization rate controller, a surface texture controller, and other optional fillers, pigments and additives. Preferably, the glass composition comprises one or more glass frits containing precursors from which diopside crystals can be formed. The diopside crystallization rate controller preferably comprises mill added sodium feldspar, potassium feldspar, nepheline, quartz, and/or spodumene, with sodium feldspar being most preferred. The surface texture controller preferably comprises a combination of zinc oxide and calcined alumina.

Using the glaze composition according to the present invention, it is possible to produce a semi-transparent to translucent, smooth, matte finish on ceramic tile that displays excellent chemical durability and abrasion resistance. The glaze composition is preferably applied to raw tiles which are then fired using single fast firing (SFF) or gres porcellanato firing cycles. The diopside crystallization rate controller moderates the speed and quantity of diopside crystallization during firing, and prevents the glaze from over-crystallizing. The surface texture controller helps the glaze form a smooth matte finish that is aesthetically pleasing. A ceramic tile made in accordance with the present invention comprises a fired ceramic body portion having the novel glaze composition fired on at least a portion of the surface thereof.

The novel glaze composition of the present invention is particularly well-suited for application on ceramic architectural tiles for it produces a semi-transparent to translucent, smooth, matte surface that exhibits excellent chemical durability and abrasion resistance.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The solids portion of the glaze composition of the present invention comprises by weight from about 35% to about 60% of a glass composition from which diopside crystals can be formed upon firing, from about 25% to about 60% of a diopside crystallization rate controller, and from about 1% to about 20% of a surface texture controller. The solids portion of the glaze composition can further comprise up to about 30% of other optional fillers, pigments, and additives.

It is important that the glass composition contain precursors from which diop side crystals can be formed upon firing. Preferably, the glass composition comprises one or more glass frits. Glass frits preferably including appropriate quantities of $SiO_2$, CaO, MgO, a low quantity of other alkali-earth oxides, and a low quantity of fluxing oxides will form diopside as the primary crystalline phase during a SFF or gres porcellanato firing cycle. It will be appreciated that if too much MgO is present, the primary crystalline phase formed will be forsterite (chemical structure: $Mg_2SiO_4$), with some diopside being present as a lesser phase. Similarly, if too much CaO is present, akermanite (chemical structure: $Ca_2MgSi_2O_7$) or wollastonite (chemical structure: $CaSiO_3$) will predominate over diopside. If too much alumina is present, anorthite (chemical structure: $CaAl_2Si_2O_8$) will be favored. And, if too much $SiO_2$ is present, quartz or cristobalite will form and phase separation will likely occur.

Generally speaking, the glass composition for use in the invention will preferably comprise one or more glass frits providing a total oxide composition as follows:

| Component | Range (Wt %) | Preferred Range (Wt %) |
|---|---|---|
| $SiO_2$ | 38–66 | 48–60 |
| CaO | 18–30 | 19–25 |
| MgO | 6–15 | 9–14 |
| $Al_2O_3$ | 0–20 | 5–10 |
| $K_2O$ | 0–3 | 2–3 |
| $Na_2O$ | 0–3 | 1–2 |
| ZnO | 0–10 | 0 |
| $ZrO_2$ | 0–9 | 0 |
| $B_2O_3$ | 0–6 | 0 |
| $TiO_2$ | 0–5 | 0 |
| $P_2O_5$ | 0–5 | 0 |

In the most preferred embodiment, the glass composition comprises a glass frit which is close to the eutectic area between CaO, MgO, and $SiO_2$, and comprises in weight percent about 51–57% $SiO_2$, about 20–24% CaO, about 10–12% MgO, about 6–8% $Al_2O_3$, about 3% $K_2O$, and about 2% $Na_2O$. Such a frit can be obtained by smelting appropriate amounts of mixed feldspar (Na and K) and dolomite, which are readily available.

The glass frit or frits that comprise the glass component may be prepared utilizing conventional glass melting techniques. A conventional ceramic refractory, fased silica, or platinum crucible may be used to prepare the glass frit. Typically, selected oxides are smelted at temperatures of from about 1,200° C. to about 1,440° C. for 30 minutes. The molten glass formed in the crucible is then converted to glass frit using water-cooled steel rollers or a water-quenching technique and milling equipment. It will be appreciated that the step of producing the glass frit is not per se critical and any of the various techniques well-known to those skilled in the art can be employed.

The glass compositions described above, and particularly the most preferred glass frit disclosed herein, energetically form diopside crystals upon firing. When used alone on ceramic tile, such glass compositions produce an unpleasant appearing surface which is very hard and dry, exhibits virtually no stain resistance, and cannot be cleaned. In order to obtain a finish which is more aesthetically appealing, the rate (both speed and quantity) of diopside crystallization must be moderated. To accomplish this goal, the solids portion of the glaze composition of the present invention must further comprises from about 25% to about 60% of a diopside crystallization rate controller.

The diopside crystallization rate controller preferably comprises one or more mill additives selected from the group consisting of sodium feldspar (predominantly $NaAlSi_3O_8$), potassium feldspar (predominantly $KAlSi_3O_8$), nepheline (predominantly (Na, K)$AlSiO_4$), and spodumene (predominantly $LiAlSi_2O_6$). It is also possible to moderate the diopside crystallization by adding a glass frit having the following composition range in weight percent: 40–80% $SiO_2$; 0–20% $Al_2O_3$; 0–10% alkali metal oxides; 0–5% $B_2O_3$; 0–5% CaO+MgO; and 0–5% other oxides. However, it appreciated that using such a glass frit to moderate the diopside crystallization will not be as cost effective as using sodium feldspar or one of the other preferred diopside crystallization rate controllers. The applicants have also discovered that fusible frits (i.e., one which is rich in $B_2O3$ and/or alkali metal oxides such as $Li_2O$) may be used to control the rate of diopside crystallization, especially when the glaze is fired at lower temperature firing cycles.

Sodium feldspar is the most preferred diopside crystallization rate controller because it is readily available at a lower cost relative to other diopside crystallization rate controllers and is particularly effective in moderating the rate of diopside crystallization. The other diopside crystallization rate controllers disclosed herein provide similar results, more or less, but do so at much greater cost.

A glaze made only with a glass composition described above and the diopside crystallization rate controller still does not provide a pleasant smooth matte surface when fired on a ceramic body. Increasing the amount of diopside crystallization rate controller causes the glaze surface to pass from a dry-matte appearance to a more glossy appearance, but the glazed surface still does not display a desirable smooth matte surface. In order to obtain a desirable smooth matte surface, the solids portion of the glaze composition of the present invention must further comprise from about 1% to about 20% by weight of a surface texture controller.

The preferred surface texture controller for use in the invention is zinc oxide. Zinc oxide can be present in the glaze as a mill addition, or it can be present in the form of a zinc oxide containing glass frit. Most glass frits containing significant quantities of zinc oxide usually also contain boron oxide and/or alkali metal oxides which are also strong diopside crystallization moderators. Therefore, when zinc oxide is added in the form of a zinc oxide containing glass frit it may be necessary to increase the amount of the diopside crystallizing glass composition present in the glaze composition and reduce the amount of the diopside crystallization rate controller present.

Most preferably, the surface texture controller comprises a combination of zinc oxide and calcined alumina. The addition of zinc oxide to glazes according to the present invention tends to reduce the rate and quantity of diopside crystallization. Accordingly, to counteract this effect, an additional amount of diopside crystal forming glass frit can be added. The additional amount of diopside crystal forming glass frit can create a risk of crazing when the glaze is used on a SFF white tile body due to mismatches between the coefficients of thermal expansion. However, the addition of calcined alumina avoids the potential crazing problem and increases the matteness of the finished surface. Thus, the solids portion of the glaze composition most preferably contains from about 1% to about 5% zinc oxide and from about 5% to about 20% calcined alumina.

Use of zinc oxide in particular is especially important for improving the matte surface of the fired glaze. For this reason, it is very difficult, but not impossible, to use other materials instead of zinc oxide as a component of the surface texture controller. Barium oxide and strontium oxides, whether in the form of oxides, carbonates or as components of glass frits, have a very small effect, but can be used. For reasons including cost and effect, zinc oxide is highly preferred.

The use of calcined alumina as a co-component of the surface texture controller is not as critical as the use of ZnO, but it is also difficult to substitute other components for it. Applicants have found that the substitution of other refractory materials commonly used in tile production instead for calcined alumina does not provide the same effect. Quartz actually inhibits the rate of diopside crystallization, and in fact can be considered a crystallizing moderator. Additional clay and kaolin are quite ineffective in providing the desired matte finish and significant quantities of these materials can adversely affect the rheological characteristics of the glaze. Calcined kaolin can be used, but it is not nearly as effective as calcined alumina. Spinel (chemical structure: $MgAl2O_4$) and zirconium silicate can be used as substitutes for calcined alumina, but spinel is very expensive and zirconium silicate acts as an opacifier and thus makes it impossible to form a semi-transparent to translucent glaze which can allow for under glaze decoration.

The glaze composition may optionally include additives and fillers such as vehicles, antifoaming agents, deflocculants, binders, wetting agents, dyes, pigments, and other common mill additions. It will be appreciated that the incorporation of mill additions that can lead to the formation of CaO and/or MgO, such as calcium carbonate, magnesium carbonate, dolomite, wollastonite, and talc, may incrementally promote diopside crystallization, but they are not necessary.

The glaze composition of the present invention may be applied using any one of a variety of conventional application techniques. For example, the glaze composition may be applied wet or dry. Such application techniques such as disk and bell applications, spraying, screen printing, brushing and electrostatic applications may be employed.

The manner in which the glaze composition is to be applied has significant bearing on the manner in which the glaze composition is made. For example, if the glaze is to be applied using a wet application technique, the glass frit(s), in flake or granular form, and other additives can be ball milled together with a vehicle, frequently water, to a fineness on average of about 1 to about 40 microns. The resulting slip, which comprises generally from about 30% to about 50% by weight of vehicle, is then in condition for application upon a ceramic body. The vehicle may be water or any of the other conventional vehicles. If the glaze composition is intended for dry or electrostatic application, the glaze can be dry milled or granulated. Other additives, such as, for example, glues, binders, and organopolysiloxanes, may be employed in the dry system.

Preferably, the glaze composition is applied to engobed green (unfired) ceramic architectural tiles at a rate of from about 0.05 to about 1.5 kg/m$^2$ at 1,500 to 1,600 g/l of density, and preferably from about 0.4 to about 0.7 kg/m$^2$ at 1,500 to 1,600 g/l of density. It will be appreciated that the application rate is not critical, and can be varied without significant impact on the resulting glazed surface. Any of the customary engobes can be used, such as FE.ENG 304, which is available from Ferro Corporation (Italy) of Casinalbo, Italy.

Firing times and temperatures will depend on the specific tile body, furnace conditions, and the size of the charge or load placed in the furnace or kiln. The glaze composition of the present invention is suitable for use in monoporosa firing cycles at about 1,100° C.–1,140° C. for about 30–50 minutes, to gres porcellanato firing cycles at about 1,180° C.–1230° C. for about 30–70 minutes. It is possible to extend the firing range to lower cycles, for example double-fast-firing (DFF) at 1,030° C. for 40 minutes, by using a stronger diopside crystallization rate controller instead of feldspar, which is too refractory at these temperatures. Suitable stronger diopside crystallization rate controllers for such lower firing cycles include fusible frits containing significant quantities of $B_2O_3$ or alkali metal oxides.

When a glazed tile is heated, the glaze forms principally a diopside crystalline phase at about 700° C. to about 800° C. In addition to the diopside crystalline phase, an anorthite crystalline phase (basic chemical structure: $CaAl_2Si_2O_8$) can also form if there is sufficient alumina present. It is also sometimes possible to detect by X-ray diffraction crystallography an albite crystalline phase (basic chemical structure: $NaAlSi_3O_8$) which is probably a residual phase of the original feldspar. Preferably, the glaze displays up to about 20% crystalline (predominantly diopside) structure, the remainder being residual glass that contributes with the very fine crystal distribution to produce a smooth glaze. it will be appreciated that if when a glaze composition according to the present invention comprises more of the diopside crystallizing glass frits and less diopside crystallization rate controllers, such glaze will develop higher amounts of crystalline phases and thus be more diopsidic.

The surface of an architectural tile having the glaze composition of the present invention fired thereon will preferably exhibit a delicate, smooth, matte appearance, much like old, worn marble. Using a gloss meter with an incident angle of 60°, glazed surfaces will exhibit values of reflected light of between 10% to 45%, depending upon the firing cycle and particular proportion of constituents in the glaze composition. With reference to the EN 101 standard, glazed surfaces according to the present invention can exhibit a Mohs value which can pass from 4 for quite glossy surfaces to 7 or more for very matte surfaces. It will be appreciated that it is possible to reach higher values on the EN 101 standard by incorporating corundum sand as part of the glaze. The addition of corundum sand does not make the glaze composition itself harder, but the extremely hard corundum sand grains prevent the scratching mineral used in the test from abrading the glaze surface. Without the addition of corundum sand, the glazed surface can reach the highest rating (PEI V) using the EN 154 standard.

The EN 122 standard defines the method to test the chemical durability of a tile surface. According to this standard, the typical values of glazed surfaces formed using the glaze composition according to the present invention are as follows:

| Characteristic | Diopside Glaze | Minimum Preferred |
|---|---|---|
| Stain resistance (methylene blue) | 1 | 1–2[a] |
| Stain resistance (KMnO$_4$) | 1 | 1–2[a] |
| NH$_4$Cl (100g/l) | AA | B[b] |
| NaClO (20 g/l) | AA | B[b] |
| CuSO$_4$ (20 g/l) | AA | B[b] |
| HCl (3% v/v) | AA | —[c] |
| Citric acid (100 g/1) | AA | —[c] |
| KOH (30 g/1) | AA | —[c] |

[a] The value can be: 1 - surface cleanable with water; 2 - surface cleanable with water and soap; 3 - surface uncleanable.
[b] The values range from AA (surface un-attacked) - A - B - C - D (worst result)
[c] No minimum value requested.

In summary, the present invention produces glazed ceramic tiles having wear surfaces that are semi-transparent to translucent, smooth and resistant to chemical attack and abrasive wear. It will be appreciated that by using specific additives, the glaze composition can be utilized to produce surfaces that are opaque, semiopaque or semitransparent. Additionally, the glaze composition of the present invention may be applied at significant thicknesses to facilitate mechanical polishing of the surface of the glaze layer.

The following examples are intended only to illustrate the invention and should not be construed as imposing limitations upon the claims:

EXAMPLE

Unless otherwise indicated, all parts and percentages are by weight and all temperatures are in degrees Centigrade (°C.). The ceramic tile bodies employed in the Examples were conventional in nature, composed principally of clay with silica, feldspar and other conventional additives included. The green (unfired) ceramic tile bodies were all engobed with a suitable engobe prior to application of the glaze composition.

Glass Frit A, which is used in all of the examples, was prepared utilizing conventional glass making techniques to provide the following composition by weight percent:

| Component | Weight % |
|---|---|
| $SiO_2$ | 60 |
| CaO | 21 |
| MgO | 14 |
| $Al_2O_3$ | 4 |
| $K_2O$ | 1 |

Glass Frit A was melted using conventional melting techniques and roller quenched to form frit flakes.

Example I

Glaze Compositions 1–4 were prepared by ball milling the components shown below until the milling residue on a 40 micron sieve was only about 0.1% to 0.2% by weight. Each glaze was applied to a separate engobed conventional green ceramic tile body at a rate of 0.4 to about 0.7 kg/m$^2$ at 1,500–1,600 g/l of density (or 0.25 to 0.4 kg/M$^2$ of dry glaze). The tiles were then subjected to a 50 minute SFF firing cycle with a maximum temperature of 1,180° C.

The composition of the glazes referred to in Example 1 in weight percent was as follows:

| Component | Glaze 1 | Glaze 2 | Glaze 3 | Glaze 4 |
|---|---|---|---|---|
| Glass Frit A | 30.5 | 37.5 | 31.5 | 36.5 |
| Sodium Feldspar | 44.5 | 6 | 10 | 10 |
| Potassium Feldspar | — | 44.5 | — | — |
| Nephelin | — | — | 29.5 | — |
| Spodumene | — | — | — | 30.5 |
| Zinc Oxide | 9 | 3 | 5 | 7 |
| Calcined Alumina | 9 | 3 | 4 | 9 |
| Quartz | — | — | 12 | — |
| Kaolin | 7 | 7 | 7 | 7 |

All of the resultant glazed tiles exhibited an aesthetically pleasing semi-transparent to translucent, smooth matte finish. Standardized test results were as follows:

| Test | Glaze 1 | Glaze 2 | Glaze 3 | Glaze 4 |
|---|---|---|---|---|
| Loss in weight (EN 154) | 0.27 g | — | — | — |
| Reflected light (% at 60°) | 16 | 18 | 25 | 18 |
| Acid resistance (EN 122) | AA | B | A | AA |
| Surface defects | None | None | None | None |

Example II

Glass Frits B, C and D were prepared utilizing conventional glass making techniques to provide the following composition by weight percent:

| Component | Frit B | Frit C | Frit D |
|---|---|---|---|
| $SiO_2$ | 51.0 | 48.5 | 48 |
| $B_2O_3$ | — | — | 6 |
| $Al_2O_3$ | 10.9 | 12.3 | 8 |
| CaO | 7 | 14.3 | — |
| MgO | — | — | — |
| BaO | 10.2 | — | — |
| ZnO | 17.1 | 18.1 | 33 |
| $Na_2O$ | 1.6 | 6.8 | 2 |
| $K_2O$ | 2.2 | — | 3 |

Glass Frits B, C and D were melted using conventional melting techniques and roller quenched to form frit flakes.

Glaze Compositions 5–8 were prepared by ball milling the components shown below until the milling residue on a 40 micron sieve was only about 0.1% to 0.2% by weight. Each glaze was applied to a separate engobed conventional green ceramic tile body at a rate of 0.4 to about 0.7 kg/m$^2$ at 1,500–1,600 g/l of density (or 0.25 to 0.4 kg/M$^2$ of dry glaze). The tiles were then subjected to a 50 minute SFF firing cycle with a maximum temperature of 1,180° C. The composition of the glazes referred to in Example 2 in weight percent was as follows:

| Component | Glaze 5 | Glaze 6 | Glaze 7 | Glaze 8 |
|---|---|---|---|---|
| Glass Frit A | 25 | 37 | 35 | 40 |
| Sodium Feldspar | 43 | 38 | 28 | 24 |
| Frit B | 15 | — | — | 10 |
| Frit C | — | 8 | — | — |
| Frit D | — | — | 19 | 10 |
| Zirconium Silicate | — | 4 | — | — |
| Calcined Alumina | 10 | 5 | 14 | 9 |
| Kaolin | 7 | 7 | 7 | 7 |
| Wollastonite | — | 10 | — | — |

All of the resultant tiles had transparent smooth matte finishes which were resistant to chemical attack and abrasion resistant.

Example III

Glass Frit E was prepared utilizing conventional glass making techniques to provide the following composition by weight percent:

| Component | Frit E |
|---|---|
| $SiO_2$ | 35.0 |
| $B_2O_3$ | 36.0 |
| $Al_2O_3$ | 7.0 |
| CaO | 11.5 |
| MgO | 1.0 |
| BaO | 7.0 |
| $Li_2O$ | 2.5 |

Glass Frit E was melted using conventional melting techniques and roller quenched to form frit flakes.

Glaze Composition 9 was prepared by ball milling the components shown below until the milling residue on a 40 micron sieve was only about 0.1% to 0.2% by weight. The glaze was applied at a rate of 0.4 to about 0.7 kg/m$_2$ to a conventional ceramic tile body that had previously been fired at about 1030° C. for 40 minutes and then cooled. The tile was then subjected to a second 40 minute DFF firing cycle with a maximum temperature of 1030° C.

The composition of the glaze referred to in Example III in weight percent was as follows:

| Component | Glaze 9 |
|---|---|
| Glass Frit A | 34 |
| Sodium Feldspar | 16 |
| Glass Frit E | 34 |
| Quartz | 5 |
| Talc | 4 |
| Kaolin | 7 |

The resultant tile had a transparent smooth matte finish which was resistant to chemical attack and abrasion resistant.

What is claimed is:

1. A glass-ceramic glaze composition comprising a glass composition comprising one or more glass frits containing precursors from which diopside crystals can be formed upon firing, a diopside crystallization rate controller, and a surface texture controller.

2. A glass-ceramic glaze composition as in claim 1 wherein said glass composition comprises one or more glass frits comprising from about 38 to about 66% by weight $SiO_2$, from about 18% to about 30% by weight CaO, from about 6% to about 13% by weight MgO, from about 0% to about 20% by weight $Al_2O_3$, from about 0% to about 3% by weight $K_2O$, from about 0% to about 3% by weight $Na_2O$, from about 0% to about 10% by weight ZnO, from about 0% to about 9% by weight $ZrO_2$, from about 0% to about 6% by weight $B_2O_3$, from about 0% to about 5% by weight $TiO_2$, and from about 0% to about 5% by weight $P_2O_5$.

3. A glass-ceramic glaze composition as in claim 1 wherein said diopside crystallization rate controller comprises one or more selected from the group consisting of sodium feldspar, potassium feldspar, nepheline, and spodumene.

4. A glass-ceramic glaze composition as in claim 1 wherein said surface texture controller comprises zinc oxide and one or more selected from the group consisting of calcined alumina, spinel, zirconium silicate, and calcined kaolin.

5. A glass-ceramic glaze composition as in claim 4 wherein said zinc oxide is present as a mill addition or as part of a glass frit.

6. A glass-ceramic glaze composition as in claim 1 wherein said glass composition comprises one or more glass frits comprising from about 48 to about 60% by weight $SiO_2$, from about 19% to about 25% by weight CaO, from about 9% to about 12% by weight MgO, from about 5% to about 12% by weight $Al_2O_3$, from about 2% to about 3% by weight $K_2O$, and from about 1% to about 2% by weight Na2O.

7. A glass-ceramic glaze composition as in claim 1 further comprising one or more optional vehicles, fillers, pigments and mill additives.

8. A glass-ceramic glaze composition as in claim 7 wherein said vehicle comprises water and said mill additives are selected from the group consisting of clay, bentonite, carboxymethylcellulose, antifoaming agents, deflocculants, binders, wetting agents, organopolysiloxanes, dyes or pigments.

9. A glass-ceramic glaze composition as in claim 1 wherein said glass component comprises from about 35% to about 60% of the solids portion of said glaze composition, said diopside crystallization rate controller comprises from about 25% to about 60% of the solids portion of said glaze composition, and said surface texture controller comprises from about 1% to about 20% of the solids portion of said glaze composition.

10. A method of producing a glazed ceramic body comprising the steps of providing a ceramic body, providing a glaze composition as in claim 1, applying said glaze composition to said ceramic body, and firing said glaze composition and said ceramic body for a period of from about 15 minutes to about 8 hours at a temperature of from about 1,000° C. to about 1,250° C. to form a glaze layer comprising oxides having a diopside crystalline structure and residual glass.

11. A ceramic tile comprising a fired ceramic body having a top and bottom surface, said top surface being provided with a glaze layer formed by the steps of providing a ceramic body, providing a glaze composition as in claim 1, applying said glaze composition to said ceramic body, and firing said glaze composition and said ceramic body for a period of from about 15 minutes to about 8 hours at a temperature of from about 1,000° C. to about 1,250° C. to form a glaze layer comprising oxides having a diopside crystalline structure and residual glass.

* * * * *